United States Patent
Khim et al.

(10) Patent No.: US 11,164,397 B2
(45) Date of Patent: Nov. 2, 2021

(54) METHOD FOR PROVIDING PARKING SERVICE USING IMAGE GROUPING-BASED VEHICLE IDENTIFICATION

(71) Applicant: EPS Company, Seoul (KR)

(72) Inventors: Key Chang Khim, Yongin (KR); Chang Dong Kim, Seoul (KR)

(*) Notice: Subject to any disclaimer, the term of this patent is extended or adjusted under 35 U.S.C. 154(b) by 407 days.

(21) Appl. No.: 16/221,877

(22) Filed: Dec. 17, 2018

(65) Prior Publication Data

US 2020/0193721 A1 Jun. 18, 2020

(51) Int. Cl.
| | | |
|---|---|---|
| *G07B 15/02* | (2011.01) | |
| *G08G 1/017* | (2006.01) | |
| *G06K 9/32* | (2006.01) | |
| *G08G 1/14* | (2006.01) | |
| *G06Q 20/40* | (2012.01) | |
| *G06T 7/20* | (2017.01) | |

(52) U.S. Cl.
CPC ........... *G07B 15/02* (2013.01); *G06K 9/3258* (2013.01); *G06Q 20/40* (2013.01); *G06T 7/20* (2013.01); *G08G 1/0175* (2013.01); *G08G 1/146* (2013.01); *G06K 2209/15* (2013.01); *G06Q 2240/00* (2013.01)

(58) Field of Classification Search
CPC ........ G07B 15/02; G06T 7/20; G08G 1/0175; G08G 1/146; G06K 9/3258; G06K 2209/15; G06K 9/00771; G06Q 20/40; G06Q 2240/00
See application file for complete search history.

(56) References Cited

U.S. PATENT DOCUMENTS

| | | | |
|---|---|---|---|
| 10,497,258 B1* | 12/2019 | Georgis | ............ G06K 9/00805 |
| 2011/0057816 A1* | 3/2011 | Noble | ............... G06K 9/46 340/937 |
| 2016/0232410 A1* | 8/2016 | Kelly | ............... G08G 1/054 |
| 2019/0043207 A1* | 2/2019 | Carranza | ............ G06K 9/00771 |
| 2019/0317217 A1* | 10/2019 | Day | ............... G01S 17/04 |

FOREIGN PATENT DOCUMENTS

KR 10-2018-0017434 2/2018

OTHER PUBLICATIONS

English Specification of 10-2018-0017434.

* cited by examiner

*Primary Examiner* — Kim Y Vu
*Assistant Examiner* — Molly Delaney
(74) *Attorney, Agent, or Firm* — Antonio Ha & U.S. Patent, LLC (57) ABSTRACT

According to an embodiment of the disclosure, a method for providing a parking service by a server configured to provide the parking service comprises obtaining a vehicle image from a closed-circuit television (CCTV) camera installed on each of both sides of each parking section of a parking lot in a direction facing a vehicle entering to capture an inside of the parking section in a direction perpendicular to an parking orientation of the vehicle, extracting a license plate of the vehicle from at least one frame included in the obtained vehicle image and tracking a trajectory of an XY-coordinate point of each vertex of the extracted license plate, detecting a time when the trajectory of the XY-coordinate point changes from a linear trajectory to a non-linear trajectory and grouping at least one frame obtained before the time into an image for the vehicle, and mapping and storing at least one license plate number recognized from the at least one frame grouped as a license plate number of the vehicle.

11 Claims, 6 Drawing Sheets

METHOD FOR PROVIDING PARKING SERVICE USING IMAGE GROUPING-BASED VEHICLE IDENTIFICATION

TECHNICAL FIELD

Embodiments of the disclosure concern car parking schemes, and more specifically, to methods for providing a parking service using image grouping-based vehicle identification.

DISCUSSION OF RELATED ART

There are various types of automated parking management and billing systems for car parking on the market. Most of such systems are typically installed at the entrance of a parking lot. Conventional car parking systems adopt plate number recognition technology to recognize vehicles accessing the parking lot.

However, conventional systems fail to respond to wrong recognition issues that may arise, e.g., when entering or passing vehicles move fast. For example, erroneous recognition may result in a plurality of different plate numbers being recognized for one vehicle entering the parking lot. In this case, the conventional system may end up counting the vehicle two or more times, resultantly causing a billing error. The same occasion may also arise when the license plate number is not clearly identified due to, e.g., dents or scratches to the number plate or being covered with dirt or in paint or when the driver who attempts to access the parking lot later changes his mind, turning around or backing up.

SUMMARY

According to an embodiment of the disclosure, a method for providing a parking service by a server configured to provide the parking service comprises obtaining a vehicle image from a closed-circuit television (CCTV) camera installed on each of both sides of each parking section of a parking lot in a direction facing a vehicle entering to capture an inside of the parking section in a direction perpendicular to an parking orientation of the vehicle, extracting a license plate of the vehicle from at least one frame included in the obtained vehicle image and tracking a trajectory of an XY-coordinate point of each vertex of the extracted license plate, detecting a time when the trajectory of the XY-coordinate point changes from a linear trajectory to a non-linear trajectory and grouping at least one frame obtained before the time into an image for the vehicle, and mapping and storing at least one license plate number recognized from the at least one frame grouped as a license plate number of the vehicle.

The time when the trajectory of the XY-coordinate point changes from the linear trajectory to the non-linear trajectory may be a time when the linear trajectory which is continuous changes to the non-linear trajectory which is discontinuous.

The time when the trajectory of the XY-coordinate point changes from the linear trajectory to the non-linear trajectory may be a time when the XY-coordinate point forming the linear trajectory as a figure formed with the XY-coordinate point enlarges or shrinks escapes off the linear trajectory due to XY coordinates of a license plate recognized for another vehicle entering or a time when the XY-coordinate point forming the linear trajectory as a length or inner area of the figure formed with the XY-coordinate point increases or decreases escapes off a preset length or size increase or decrease rate over time due to recognition of the XY coordinates of the other vehicle.

The method may further comprise, before obtaining the vehicle image from the CCTV camera, obtaining an entry image from an entrance camera installed at an entrance of the parking lot to face an entering vehicle and configured to capture the entering vehicle, extracting a license plate of the entering vehicle from at least one frame included in the entry image and tracking a trajectory of an XY-coordinate point of each vertex of the extracted license plate, and where an inner area of a figure formed with the XY-coordinate point changes from increasing or decreasing or where a trajectory of the XY-coordinate point changes from extending to contracting, regarding the entering vehicle as not entering the parking lot and excluding the entering vehicle from parking car counting.

The method may further comprise, before obtaining the vehicle image from the CCTV camera, obtaining an entry image from an entrance camera installed at an entrance of the parking lot to face an entering vehicle and configured to capture the entering vehicle, extracting a license plate number of the entering vehicle from the entry image, where the license plate number contains a preset error, performing artificial intelligence (AI)-based error correction, where the preset error is included even after the error correction, sending a request for error correction to a manager terminal to display an error correction request popup window, and upon receiving an error-corrected license plate number from the manager terminal in response to the error correction request, mapping and storing the error-containing license plate number and the error-corrected license plate number.

The method may further comprise, after mapping and storing the error-containing license plate number and the error-corrected license plate number, extracting a license plate number from the vehicle image obtained by the CCTV camera, and where the extracted license plate number is the same as the error-containing license plate number, recognizing the extracted license plate number as the error-corrected license plate number.

The method may further comprise, after mapping and storing the error-containing license plate number and the error-corrected license plate number, extracting a license plate number from the vehicle image obtained by the CCTV camera, and where the extracted license plate number is different from the error-containing license plate number or the error-corrected license plate number, disregarding the extracted license plate number.

Obtaining the vehicle image from the CCTV camera may include overlaying a virtual line corresponding to a border line of each parking section to identify the parking section and obtaining the vehicle image and excluding an image of a vehicle driving outside the virtual line from license plate recognition.

The method may further comprise, by the server, identifying an available parking space in each parking section using a virtual line to partition each parking section and each parking space; assigning an identifier of an available parking space to a vehicle entering the parking lot and where the entering vehicle is recognized by at least one controller positioned at, at least, one aisle intersection in the parking lot, controlling at least one display positioned at the at least one aisle intersection to output the identifier.

The method may further comprise, after mapping the at least one license plate number recognized from the at least one frame grouped as the license plate number of the vehicle, upon receiving a parking fee payment request from a user terminal of a driver of the vehicle, searching for a preset license plate number using a license plate number entered from the user terminal, calculating a parking fee by multiplying a per-unit time parking rate by a parking time which is a difference between an entrance time for the preset license plate number searched for and a current time and transmitting the parking fee to the user terminal, performing a payment process upon receiving a request for payment for the parking fee using a pre-stored payment means from the user terminal, and when the payment process is authorized, allowing a vehicle corresponding to the license plate number entered from the user terminal to be pulled away.

Mapping the at least one license plate number recognized from the at least one frame grouped as the license plate number of the vehicle may include designating a most recognized one of the at least one license plate number as the license plate number of the vehicle and mapping and storing the at least one license plate number based on the designated license plate number.

According to an embodiment of the disclosure, there is provided an application configured to execute the method while interoperating with the server and stored in a storage medium.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EXEMPLARY EMBODIMENTS

Hereinafter, exemplary embodiments of the inventive concept will be described in detail with reference to the accompanying drawings. The inventive concept, however, may be modified in various different ways, and should not be construed as limited to the embodiments set forth herein. Like reference denotations may be used to refer to the same or similar elements throughout the specification and the drawings. However, the present invention may be implemented in other various forms and is not limited to the embodiments set forth herein. For clarity of the disclosure, irrelevant parts are removed from the drawings, and similar reference denotations are used to refer to similar elements throughout the specification.

In embodiments of the present invention, when an element is "connected" with another element, the element may be "directly connected" with the other element, or the element may be "electrically connected" with the other element via an intervening element. When an element "comprises" or "includes" another element, the element may further include, but rather than excluding, the other element, and the terms "comprise" and "include" should be appreciated as not excluding the possibility of presence or adding one or more features, numbers, steps, operations, elements, parts, or combinations thereof.

When the measurement of an element is modified by the term "about" or "substantially," if a production or material tolerance is provided for the element, the term "about" or "substantially" is used to indicate that the element has the same or a close value to the measurement and is used for a better understanding of the present invention or for preventing any unscrupulous infringement of the disclosure where the exact or absolute numbers are mentioned. As used herein, "step of" A or "step A-ing" does not necessarily mean that the step is one for A.

As used herein, the term "part" may mean a unit or device implemented in hardware, software, or a combination thereof. One unit may be implemented with two or more hardware devices or components, or two or more units may be implemented in a single hardware device or component.

As used herein, some of the operations or functions described to be performed by a terminal or device may be, instead of the terminal or device, performed by a server connected with the terminal or device. Likewise, some of the operations or functions described to be performed by a server may be performed by a terminal or device connected with the server, instead of the server.

As used herein, some of the operations or functions described to be mapped or matched with a terminal may be interpreted as mapping or matching the unique number of the terminal, which is identification information about the terminal, or personal identification information.

Hereinafter, embodiments of the disclosure are described in detail with reference to the accompanying drawings.

Figure 1:
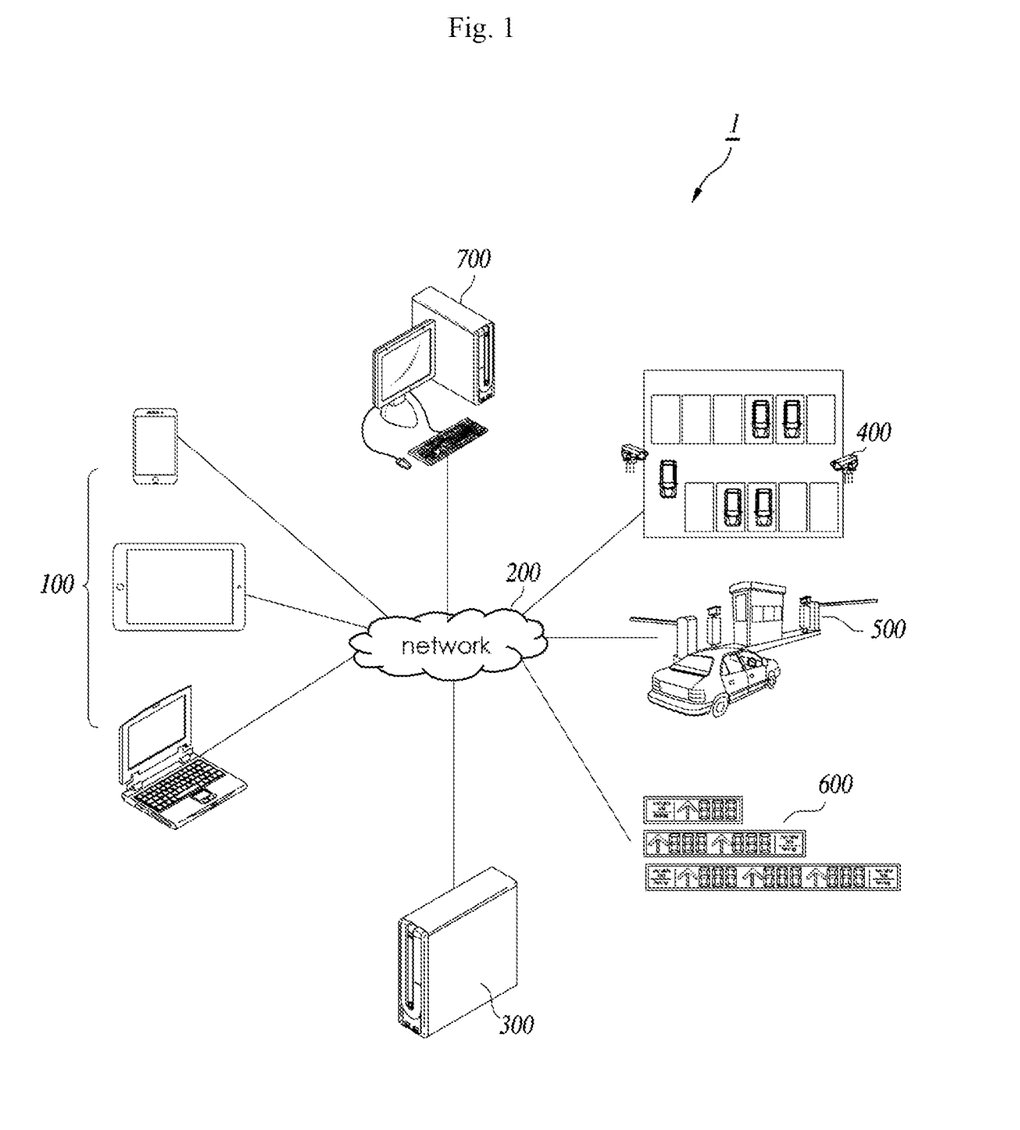
FIG. 1 is a view illustrating a parking service providing system using image grouping-based vehicle identification according to an embodiment of the disclosure.

FIG. 1 is a view illustrating a parking service providing system using image grouping-based vehicle identification according to an embodiment of the disclosure. Referring to FIG. 1, a parking service providing system 1 using image grouping-based vehicle identification may include at least one user terminal 100, a parking service providing server 300, at least one closed-circuit television (CCTV) camera (or surveillance camera) 400, at least one entrance camera 500, a display 600, and a manager terminal 700. However, the parking service providing system 1 using image grouping-based vehicle identification as illustrated in FIG. 1 is merely an example, and the scope of the present invention is not limited by FIG. 1.

The components of the system 1 are connected together via a network 200. For example, referring to FIG. 1, the at least one user terminal 100 may be connected with the parking service providing server 300 via the network 200. The parking service providing server 300 may be connected with the at least one user terminal 100, the at least one CCTV camera 400, the at least one entrance camera 500, the display 600, and the manager terminal 700 via the network 200. The at least one CCTV camera 400 may be connected with the parking service providing server 300 via the network 200. The at least one entrance camera 500 may be connected with the parking service providing server 300 via the network 200. The display 600 may be connected with the safe transaction service providing server 300 via the network 200. The display 600 may be connected with the parking service providing server 300 via the network 200. The manager terminal 700 may be connected with the parking service providing server 300, the at least one CCTV camera 400, the at least one entrance camera 500, and the display 600 via the network 200.

Here, the term "network" means a connecting structure to enable exchanging of information between nodes, such as a plurality of terminals and servers. Examples of such network may include, but are not limited to, a radio frequency (RF) network, a 3rd Generation Partnership Project (3GPP) network, a Long Term Evolution (LTE) network, a Long Term Evolution-Advanced (LTE-A) network, a 5th Generation Partnership Project (5GPP) network, a World Interoperability for Microwave Access (WIMAX) network, an Internet network, a Local Area Network (LAN) network, a Wireless LAN network, a Wide Area Network (WAN) network, a Personal Area Network (PAN) network, a Bluetooth network, a satellite broadcast network, an analog broadcast network, and a Digital Multimedia Broadcasting (DMB) network.

As used herein, the singular forms "a," "an," and "the" are intended to include the plural forms as well, unless the context clearly indicates otherwise. According to embodiments, a plurality of components of the same type may be a single component of the type, and one component may add one or more components of the same type.

The at least one user terminal 100 may be a user terminal of a car driver or owner who pays for parking fees or identifies a parking section using an application, a program, an app page, or a webpage related to the parking service using image grouping-based vehicle identification.

The at least one user terminal 100 may send a request for payment to the parking service providing server 300 using at least one payment means or authentication means previously stored or may receive a result of payment authorization from the parking service providing server 300.

The at least one user terminal 100 may be implemented as a computer capable of accessing a remote server or terminal via the network. Here, the computer may be, e.g., a navigation or web browser-equipped laptop computer or desktop computer. The at least one user terminal 100 may be implemented as a terminal capable of accessing a remote server or terminal via the network. The at least one user terminal 100 may be, e.g., a portable mobile wireless communication device examples of which may include navigation devices, a Personal Communication System (PCS), Global System for Mobile communications (GSM), Personal Digital Cellular (PDC), Personal Handyphone System (PHS), Personal Digital Assistant (PDA), International Mobile Telecommunication (IMT)-2000, Code Division Multiple Access (CDMA)-2000. W-Code Division Multiple Access (W-CDMA), Wireless Broadband Internet (WiBro) terminal, a smartphone, a smartpad, tablet PC, or any other various types of handheld wireless communication devices.

The parking service providing server 300 may be a server to provide a webpage, app page, program, or application for parking service using image grouping-based vehicle identification. The parking service providing server 300 may obtain a vehicle image from at least one CCTV camera 400, recognizes a license plate contained in the obtained vehicle image, and tracks the trajectory of XY coordinates corresponding to each vertex of the license plate.

There is a time when the trajectory changes from a continuous, linear to discontinuous, non-linear trajectory, the parking service providing server 300 may group at least one frame or image in a video captured before the time. The parking service providing server 300 may extract and recognize license plate numbers from the at least one frame or image grouped and map and store the vehicle images and the license plate numbers. Where the recognized license plate numbers differ from each other, the parking service providing server 300 may set the majority license plate number (e.g., the most frequent license plate number among the recognized license plate numbers) as the license plate number of the vehicle and map and store the majority license plate number and the other license plate numbers, so that although the different license plate numbers, although later recognized by another CCTV camera 400, may be recognized as the majority license plate number. Where the trajectory of XY coordinates of the license plate number received from the entrance camera 500 indicates a U turn or backup, e.g., where the line connecting the points corresponding to the XY coordinates extends and then contracts, or where the figure connecting or including the points corresponding to the XY coordinates enlarges and then shrinks, the parking service providing server 300 may exclude the corresponding vehicle from counting as a parking car. Upon obtaining the vehicle image from the at least one CCTV camera 400, the parking service providing server 300 may process the partitioning or border lines delineated to partition each parking section using virtual lines, recognizing the license plate numbers of vehicles entering the virtual lines, but not for vehicles exiting the virtual lines. The parking service providing server 300 may set, as a parking surface, the XY coordinates at the time when the figure including the point corresponding to the XY coordinates in the vehicle image obtained from the CCTV camera 400 enlarges or shrinks to disappear, and transmit information about the parking surface and the corresponding parking section to the user terminal 100. Where a recognized license plate number contains a preset error (e.g., wrong characters or a wrong string), the parking service providing server 300 may correct the error based on artificial intelligence (AI). Where the error is still present even after correction, the parking service providing server 300 may send a request for check to the manager terminal 700, and upon receiving an error-corrected license plate number in response to the request, the parking service providing server 300 may map and store the error-containing license plate number and the error-corrected license plate number so that although another CCTV camera 400 recognizes the wrong license plate number, the wrong license plate number may be recognized as the error-corrected license plate number. When a vehicle enters the parking lot, the parking service providing server 300 may map and store an identifier of an available parking space and the license plate number of the vehicle, and where the vehicle is recognized by at least one camera (not shown) positioned in an aisle or an aisle intersection, the parking service providing server 300 may output the identifier and a direction form the aisle or aisle intersection to the available parking space on the display 600. Upon receiving a request for paying for parking fee from the user terminal 100, the parking service providing server 100 may calculate the parking fee based on the difference between the time of entrance and the time of the request and a per-unit time parking rate and enable the calculated parking fee to be processed for payment on the user terminal 100.

The parking service providing server 300 may be implemented as a computer capable of accessing a remote server or terminal via the network. Here, the computer may be, e.g., a navigation or web browser-equipped laptop computer or desktop computer.

The at least one CCTV camera 400 may capture at least one parking section. Although the CCTV camera 400, entrance camera 500, and the camera (not shown) installed at an aisle intersection are denoted in different terms and different reference numbers, the cameras may be CCTV cameras with the same functionality and have been so termed solely for ease of description. However, the cameras are not limited to ones with the same functionality and may rather have different functionalities. The at least one CCTV camera 400 may be installed at each parking section to capture the parking section. The at least one CCTV camera 400 may be installed on both sides of each parking section to face vehicles entering. The at least one CCTV camera 400 may be installed perpendicular to the parking orientation of vehicles. The at least one CCTV cameras 400 may be installed in parallel with the direction in which a vehicle enters and capture the inside of the parking section. The entrance camera 500 may be installed at the entrance of the parking lot to capture vehicles entering to the parking lot.

The display 600 may be a server to output images, symbols, or content for indicating the direction and identifiers, such as of available parking spaces, received from the parking service providing server 300. The display 600 may receive and output a signal output where a vehicle is recognized for its presence at the aisle intersection by at least one camera (not shown) by the parking service providing server 300. The display 600 may be a time-synchronized device.

Upon receiving a request for checking on an error-containing license plate number or an unrecognized license plate number from the parking service providing server 300, the manager terminal 700 may receive a reply, e.g., an error-corrected license plate number, from the user and transmit the replay to the parking service providing server 300. The manager terminal 700 may be implemented as a computer capable of accessing a remote server or terminal via the network.

Here, the computer may be, e.g., a navigation or web browser-equipped laptop computer or desktop computer. The manager terminal 700 may be implemented as a terminal capable of accessing a remote server or terminal via the network. The manager terminal 700 may be, e.g., a portable mobile wireless communication device examples of which may include navigation devices, a Personal Communication System (PCS), Global System for Mobile communications (GSM), Personal Digital Cellular (PDC), Personal Handyphone System (PHS), Personal Digital Assistant (PDA), International Mobile Telecommunication (IMT)-2000, Code Division Multiple Access (CDMA)-2000, W-Code Division Multiple Access (W-CDMA), Wireless Broadband Internet (WiBro) terminal, a smartphone, a smartpad, tablet PC, or any other various types of handheld wireless communication devices.

Figure 2:
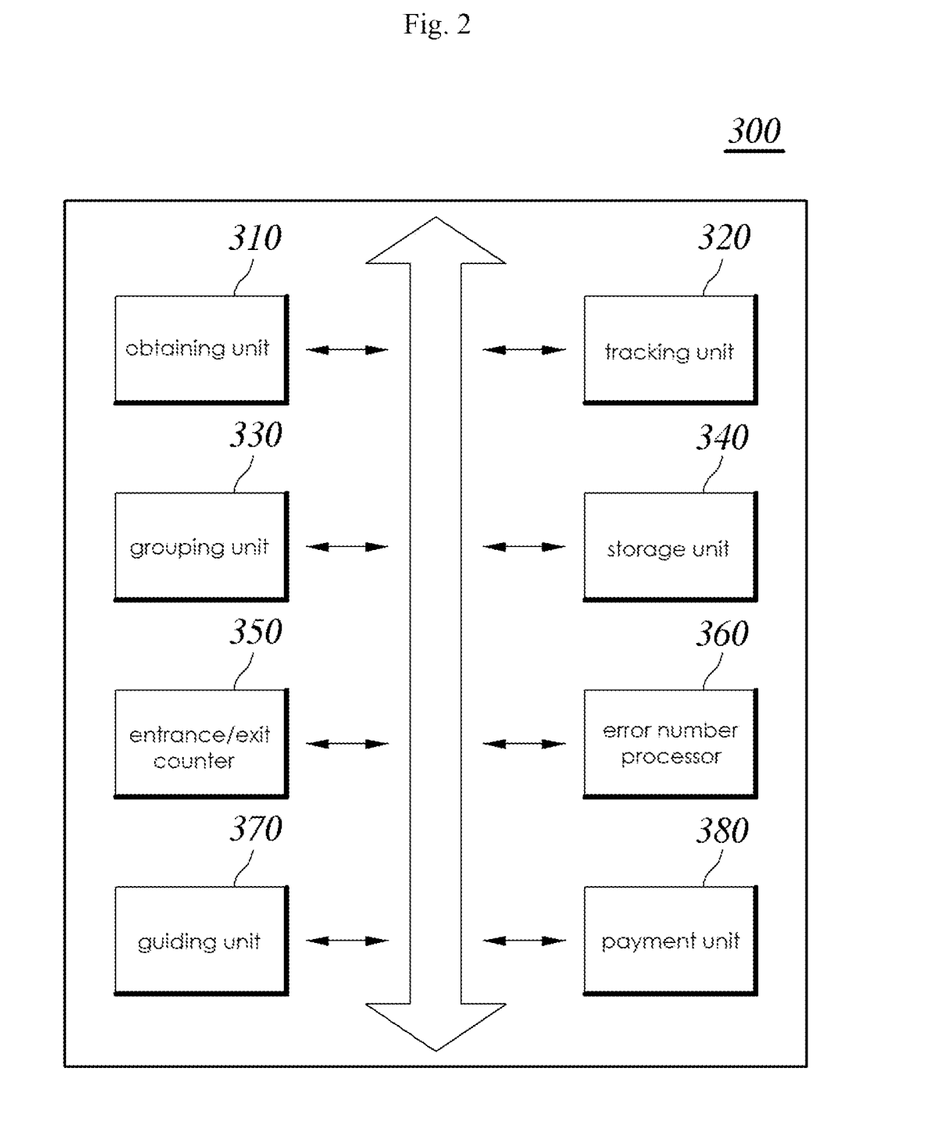
FIG. 2 is a block diagram illustrating a configuration of a parking service providing server in a system as illustrated in FIG. 1.

FIG. 2 is a block diagram illustrating the parking service providing server included in the system of FIG. 1. FIG. 3 is a view illustrating an example of a parking service using image grouping-based vehicle identification according to an embodiment of the disclosure.

Referring to FIG. 2, the parking service providing server 300 may include a obtaining unit 310, a tracking unit 320, a grouping unit 330, a storage unit 340, an entrance/exit counter 350, an error number processor 360, a guiding unit 370, and a payment unit 380.

According to an embodiment, where the parking service providing server 300 or another server (not shown) interoperating with the parking service providing server 300 transmits an application, program, app page, or webpage for the parking service using image grouping-based vehicle identification to the user terminal 100 and the manager terminal 700, the user terminal 100 and the manager terminal 700 may install and open the the application, program, app page, or webpage for the parking service using image grouping-based vehicle identification. A service program may be driven or run on the the user terminal 100 and the manager terminal 700 using a script executed on a web browser. Here, the web browser may be a program or application that enables use of world wide web (WWW) services or that receives and shows hyper text written in the hyper text mark-up language (HTML), and the web browser may include. e.g., Netscape, Explorer, or Chrome. The term "application" may mean an application executed on the terminal, and the application may include, e.g., an app running on a mobile terminal, e.g., a smartphone.

Referring to FIG. 2, CCTV cameras 400 may be installed on both sides of each parking section to capture a vehicle image of a vehicle in each parking section in a direction perpendicular to the orientation where vehicles are parked. The CCTV cameras 400 may be installed to face vehicles entering. The obtaining unit 310 may obtain the vehicle image from the CCTV cameras 400. Two CCTV cameras 400 are installed per parking section to face the inside of the parking section to be able to capture the inside of the parking section. This may address wrong recognition of parking section that may occur when the CCTV cameras also captures the outside of the parking section and reduce processing time and consumption of networking resources by allowing for tracking of license plate number trajectory only for vehicles located inside the parking section.

When the at least one CCTV camera 400 obtains a vehicle image, the obtaining unit 310 may allow the CCTV camera 400 to overlay a virtual partitioning line corresponding to the border line of each parking section to partitioning each parking section from another and obtain the vehicle image. The obtaining unit 310 may exclude vehicles driving outside the virtual partitioning lines from targets for license plate number recognition. For example, the CCTV cameras 400, although installed to capture the inside of the parking section, may happen to capture other areas than those supposed to be captured due to the angle or position of installation. For illustration purposes, such a scenario case may be considered where parking sections A, B, and C are arranged, a first CCTV camera 400 is installed on the border line between parking sections A and B to face parking sections B and C, and a second CCTV camera 400 is installed on the border line between parking sections B and C to face parking sections A and B. The obtaining unit 310 may overlay the virtual line corresponding to the border line between parking sections B and C on the screen of the image transmitted from the first CCTV camera 400 and the virtual line corresponding to the border line between parking sections A and B on the screen of the image transmitted from the CCTV camera 400 to exclude vehicle images of vehicles traveling outside parking section B, thereby reducing computation loads for license plate number recognition.

The tracking unit 320 may extract the license plate of the target vehicle from at least one frame contained in the obtained vehicle image and track the trajectory of the XY coordinates of each vertex of the extracted license plate. For example, as a method for recognizing the license plate, two to four of the vertexes of the license plate which is typically rectangular may be extracted, and the text inside the surface obtained by connecting the vertexes together may be extracted. In this case, since a plurality of images are typically generated per second, although license plate recognition is intended to be performed on a single vehicle, image processing is performed on a number of images. The vehicle's continuous movement may cause the license plate to be blurred in the frame. According to an embodiment, at least one frame or image captured or obtained before the time when the tracked trajectory of the XY coordinates corresponding to the vertexes of the license plate varies from a linear to non-linear trajectory is grouped, license plate numbers are read out form the at least one frame or image grouped, where the license plate numbers read out differ from each other, and the license plate number that is in the majority among the license plate numbers is recognized as the license plate number of the vehicle while the other license plate numbers in the minority are mapped with the recognized license plate number and stored so that the vehicle can be recognized as the same and as the license plate number in the majority although erroneously recognized due to its movement. The trajectory tracking method is not limited as extracting the vertexes of the license plate as described above, and other various methods are also available. For example, such trajectory tracking may also be achieved by selecting at least one or more edges or points on the vehicle and tracking their trajectory.

Thus, the grouping unit 330 may detect the time when the trajectory of XY coordinates varies from a linear to non-linear trajectory and group at least one frame obtained before the time as images for the corresponding vehicle. The time when the trajectory varies from a linear to non-linear trajectory may be the time when a continuous linear trajectory is changed to a discontinuous non-linear trajectory. For example, it is assumed that vehicle A enters parking section B and is captured by a CCTV camera 400. In this case, the license plate of vehicle A may look like it gradually enlarges while coming from top to down on the screen due to perspective. It is here assumed that vehicle Z shows up at the top right on the screen of the CCTV camera 400. In this case, as the XY coordinates of the license plate may be shifted to the XY coordinates of the license plate of vehicle Z, the trajectory, which used to come from top to down on the screen, may sharply turn to the top right on the screen and hence and hence lose continuity, i.e., changing to a non-linear trajectory. Thus, the time when the linear trajectory changes to the non-linear trajectory may be defined as a time of entrance of another vehicle, and a time period before the time of trajectory change may be defined as a time period during which only one vehicle used to exist. Therefore, all of at least one frame or image before the time of trajectory change from a linear to non-linear trajectory may be defined as images of vehicle A, and where vehicle A is identified in the group of the at least one frame or image, it is possible to figure out the correct license plate number although the license plate number of vehicle A may be wrong recognized from the group.

Thus, the time of the linear trajectory changing to the non-linear trajectory may be the time when the points indicated by the XY coordinates and forming a linear trajectory as the figure formed with the XY coordinates enlarges or shrinks happens to escape off the linear trajectory due to the XY coordinates of the license plate of another vehicle entering. Or, the time of the linear trajectory changing to the non-linear trajectory may be the time when the points indicated by the XY coordinates and forming a linear trajectory as the length or area of the figure formed with the XY coordinates increases or decreases happens to escape off a preset length or size increase or decrease rate over time due to entrance of another vehicle and resultantly recognition of the XY coordinates of the other vehicle. As used herein, the term "figure" may be defined as a line connecting two XY-coordinate points or an outline connecting four XY-coordinate points. The figure may also mean its inner surface.

The storage unit 340 may map and store, as the license plate number of a vehicle, at least one character or string of a license plate number recognized from at least one frame grouped.

For example, where the license plate number 123X, the license plate number 1236, and the license plate number 1234, respectively, are recognized from frame 1, frame, 2, and frames 3 to 10 among the images captured by the CCTV camera 400 located at parking section A, all the numbers may be mapped together into 123X-1236-1234 which may then be stored. In this case, "1234" is recognized from eight frames, i.e., frames 3 to 10, "123X" is recognized from one frame, and "1236" is recognized from one frame. Thus, "1234" is the majority license plate number. "1234" may be identified as the correct number, and "123X" and "1236" may be recognized as wrong recognized. "123X" and "1236," as well as "1234," are stored. The fact that a wrong license plate number is detected from images captured by the CCTV camera 400 at parking section A may mean that detection of a wrong license plate number may also arise from images captured by the CCTV camera 400 at parking section A or other parking section. Thus, although the license plate number is wrong recognized as "123X" from images captured by the CCTV camera 400 at the other parking section and the vehicle moves, the correct license plate number "1234" may be recognized by referring to "123X-1236-1234." This may prevent one vehicle from being counted two or more times due to wrong detection of license plate number and reduce any error that may occur upon calculating parking fee or counting parking vehicles.

The at least one entrance camera 500 may be installed at the entrance of the parking lot to face entering vehicles to capture entry of vehicles. The entrance/exit counter 350 may obtain vehicle entry images from the entrance camera 500 before the obtaining unit 310 obtains a vehicle image from the CCTV camera 400. The entrance/exit counter 350 may extract the license plate of the target vehicle from at least one frame contained in the vehicle entry images and track the trajectory of the XY coordinates of each vertex of the extracted license plate. Where the inner area of the figure formed with the XY coordinates changes from increasing or decreasing or where the trajectory of XY coordinates changes from extending to shrinking, the entrance/exit counter 350 regards the corresponding vehicle as not entering the parking lot and abstains from counting as a parking vehicle.

In a conventional system for counting vehicles entering a parking lot, a looped coil is installed under the floor of the space that vehicles enter. Where a vehicle passes over the looped coil, the looped coil creates a frequency variation. The system regards the vehicle having passed through the looped coil as having entered the parking lot and subtracts 1 from the number of available parking spaces A driver who is confused for the destination or is reluctant to pay for the parking fee may make a U-turn or back up before passing through the parking lot gate at the entrance of the parking lot, and this case is not counted and the number of available parking spaces remains in the prior state, i.e., the state of the one less number of available parking spaces. Where such occasion increases, the parking capacity may be indicated as "parking unavailable" despite indeed available. To avoid backing-up or u-turning vehicles from being counted as those to park, the energy converting circuit 350 may detect the license plate number of a vehicle, which is shown in an image captured by the entrance camera 500, enlarging as the vehicle enters and shrinking as the vehicle backs up. A method substantially the same as that described above may apply to such detection. For example, where the XY-coordinate trajectory used to extend turns to shrink or where the area (size) of a figure formed with XY-coordinate points which used to increase turns to decrease, the vehicle may be determined to back up or make a U-turn.

The at least one entrance camera 500 may be installed at the entrance of the parking lot to face entering vehicles to capture entry of vehicles. The error number processor 360 may obtain vehicle entry images from the entrance camera 500 before the obtaining unit 310 obtains a vehicle image from the CCTV camera 400. The error number processor 360 may extract characters or a string form the license plate extracted from the image captured by the entrance camera 500, and wherein the characters or string include a preset wrong character or string, the error number processor 360 may perform artificial intelligence (AI)-based error correction. Where the preset wrong character or string still remains even after error correction, the error number processor 360 may send a request for error correction to the manager terminal 700 to display (600) an error correction request popup window. Upon receiving a feedback of error-corrected character or string from the manager terminal 700, the error number processor 360 may map and store the wrong character-(or string-) containing license plate number and the error-corrected license plate number. The entrance camera 500 may include at least one CCTV camera 500 installed at a parking section or other camera (not shown) installed at other parking lot.

For example, a license plate number cannot be recognized from its image where the license plate is crushed, folded, or covered in paint. Such an example is taken where the license plate number is 1234 and the license plate has been folded on its right corner for illustration purposes. Part of the license plate number, "123," may be recognized by image recognition technology but the rest "4" might not even with AI technology. In this case, the error number processor 360 may fail to recognize "4" which comes after "123," transmit a popup window to the manager terminal 700 of the manager at the entrance camera 500 to allow the manager to immediately check the license plate number. The manager may check the license plate number with the naked eye and enter "1234," and the error number processor 360 maps the numbers into "123□-1234" which is then stored. Since the corner-folded license plate is expected to be unrecognizable not only at the entrance of the parking lot but also inside the parking lot, the error number processor 360 may map and store the wrong recognized number (or error-containing license plate number) and the corrected number (or error-corrected license plate number) in the format of ['wrong recognized number'-'corrected number') (or ['error-containing license plate number'-'error-corrected license plate number'). Thus, although "123□" is recognized from an image captured by the CCTV camera 400 inside the parking lot, the number may be regarded as "1234."

Upon receiving the error-corrected license plate number as a feedback responsive to the error correction request from the manager terminal 700, the error number processor 360 may map and store the error-containing license plate number and the error-corrected license plate number. Where the license plate number extracted from the vehicle image obtained by the CCTV camera 400 is the same as the error-containing license plate number, the error number processor 360 may recognize the extracted license plate number as the error-corrected license plate number.

Upon receiving the error-corrected license plate number as a feedback responsive to the error correction request from the manager terminal 700, the error number processor 360 may map and store the error-containing license plate number and the error-corrected license plate number. Where the license plate number extracted from the vehicle image obtained by the CCTV camera 400 is different from the error-containing license plate number and the error-corrected license plate number, the error number processor 360 may disregard the extracted license plate number as the error-corrected license plate number. For example, since the entrance camera 500 captures images ahead, and the CCTV camera 400 is installed on the ceiling to capture images downwards, the entrance camera 500 may exhibit a better image recognition rate than the CCTV camera 400. The error number processor 360 may disregard license plate numbers which have been captured by the CCTV camera 400 but are not recognized by the entrance camera 500, thereby reducing an error rate of number recognition and computation load while presenting a higher image recognition rate.

The parking service providing server 300 may identify parking spaces where no vehicle is parked using the virtual lines for partitioning each parking space or each parking section from another, and when a vehicle enters, assign an identifier for an available parking space to the vehicle. Where the vehicle is recognized by at least one camera installed at, at least, one aisle branch in the parking lot, the guiding unit 370 may control at least one display 600, which is positioned at, at least, one aisle branch to output the identifier. As used herein, "parking space" may be a unit of parking where a single vehicle is parked, and "parking section" may refer to an area for car parking including a plurality of parking spaces.

For example, the parking service providing server 300 may identify whether a parking space is filled by overlaying virtual lines corresponding to the partitioning lines delineated for the parking sections and the parking spaces. For example, where one parking lot includes parking section A with four parking spaces arranged in the order of W-X-Y-Z and three other parking sections B, C, and D which are full, and vehicles are detected from parking spaces X, Y, and Z, parking space W may be regarded as available for parking. In this case, where a vehicle of which the license plate number is 1234 enters, the driver would have to check each parking sections A, B, C, and D absent notice of any available one. The guiding unit 370 may map and store the license plate number 1234 and parking space W of parking section A and display parking space W of parking section on the display 600 at each aisle intersection where the license plate number 1234 is recognized by, e.g., a camera, thereby assisting the driver in parking in a quick and convenient way.

The storage unit 340 may map and store the at least one license plate number recognized from the at least one frame grouped, as the license plate number of the vehicle. Upon receiving a parking fee payment request form the user terminal 100 which is possessed by the driver of the vehicle, the payment unit 380 may search for a pre-stored license plate number using a license plate number entered from the user terminal 100. The payment unit 380 may calculate the parking fee by multiplying a per-unit time parking rate by the parking time which is the difference between the entrance time corresponding to the pre-stored license plate number searched for and the current time and transmit the calculated parking fee to the user terminal 100. Upon receiving a parking fee payment request using a pre-stored payment means from the user terminal 100, the payment unit

380 may perform a payment process. Where the payment process is authorized, the payment unit 380 may allow the vehicle of the license plate number entered from the user terminal 100 to be pulled away. This enables payment of parking fees on an application, allowing for more convenience to users who do not have cash with them or are annoyed with waiting in a queue for payment.

Operations of each component of the parking service providing server of FIG. 2 are described below in detail with reference to FIG. 3. However, what is described below is merely an example, and embodiments of the disclosure are not limited thereto.

Figure 3A:
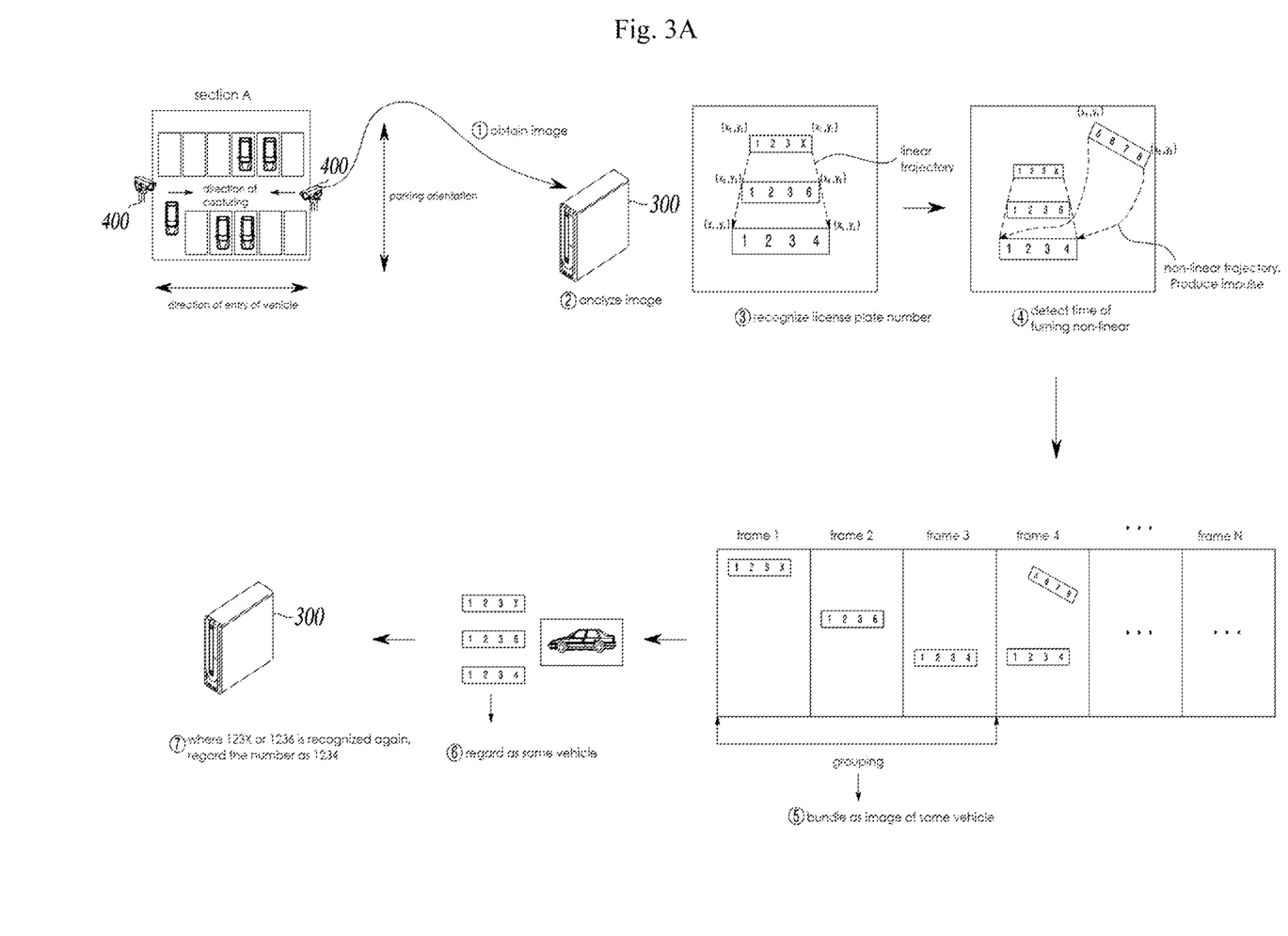
FIGS. 3A and 3B are views illustrating an example of a parking service using image grouping-based vehicle identification according to an embodiment of the disclosure.

Referring to FIG. 3A, the parking service providing server 300 obtains images from the CCTV cameras 400 installed on both sides of parking section A to capture the inside of parking section A (①), analyzes the images (②), and detects a vehicle from the images and tracks the trajectory of XY coordinates corresponding to each vertex of the license plate of the detected vehicle (③). Where the vehicle approaches the CCTV camera 400, the license plate may look like enlarging so that the trajectory of the XY coordinates may be continuous. Where another car of which the license plate number is 5678 shows up on the top right on the screen, the XY coordinates may be discontinuously shifted to a top right point (④). For example, assuming that the trajectory corresponding to the vehicle of the license plate 1234 travels 2 cm per second on the screen, its movement may quicken, e.g., 10 cm per second, after the 5678 vehicle shows up, causing the trajectory to lost continuity. Thus, the time that continuity is lost is defined as the time of changing to a non-linear trajectory, and images obtained before a non-linear trajectory is found are defined as images of the 1234 vehicle.

The parking service providing server 300 groups and stores at least one image or frame obtained before the trajectory changes to a non-linear trajectory and extracts the license plate number from each frame or image (⑤), and even though the license plate numbers extracted differ from each other, the parking service providing server 300 recognizes the extracted license plate numbers as those of the same vehicle (⑥). This may be done so to prevent one vehicle from being regarded as having two or more license plate numbers due to wrong recognition that may arise from, e.g., image blur, when the vehicle moves fast and to avoid future wrong recognition by allowing the vehicle to be recognized as the same one as long as its license plate number belongs to the same group stored even when the same error later occurs from other images.

Although later recognizing the license plate number "123X" or "1236" from images, the parking service providing server 300 may regard them as "1234" since the majority license plate number governs. For example, where "1234" is recognized twice, and "123X" or "1236" only once, "1234" is the majority license plate number, and thus, is highly likely to be the correct license plate number. Although the two frames are taken as the multiple frames in the instant embodiment, the multiple frames may apparently be a few tens of or a few hundreds of frames given the reality that several tends of frames or images may be produced per second.

Figure 3B:
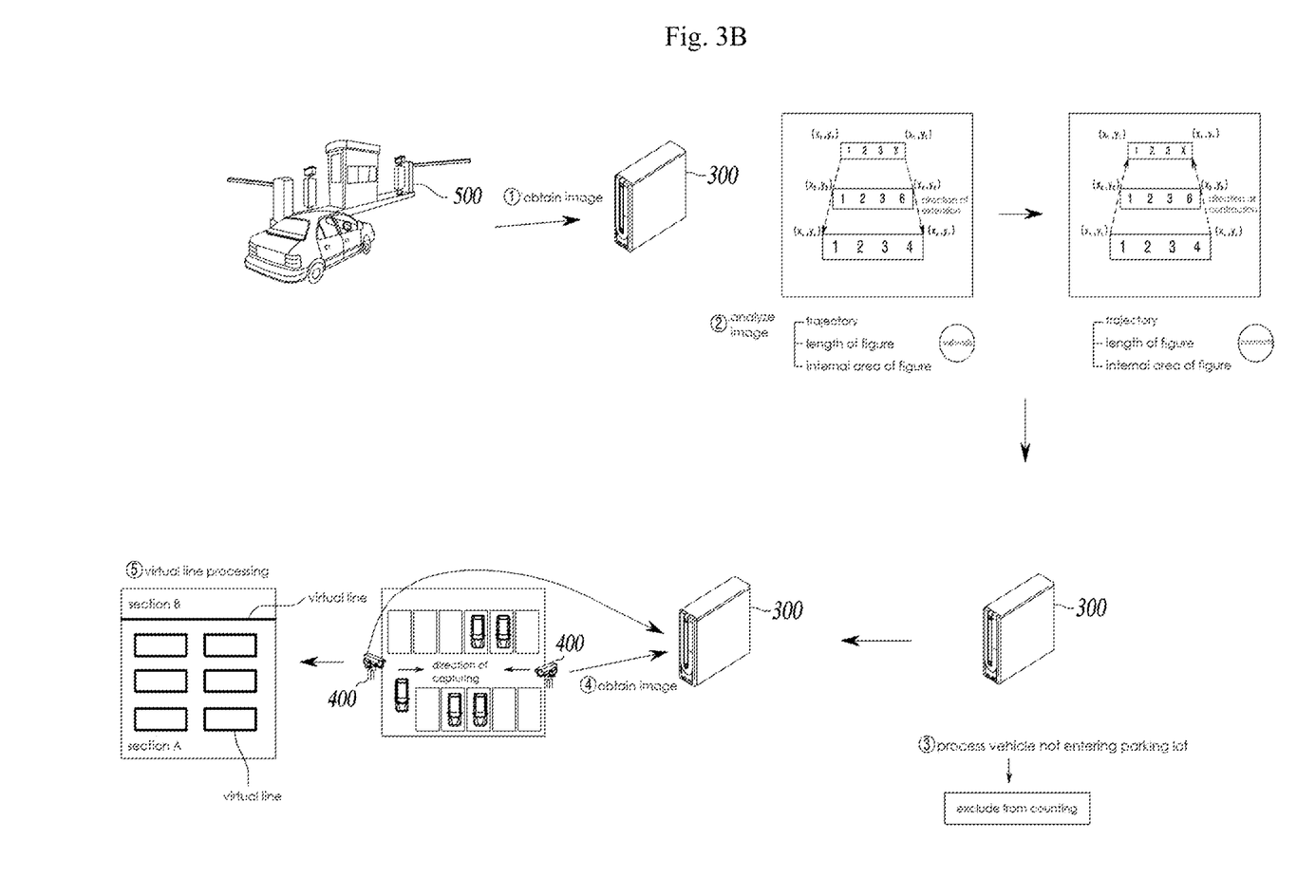

Described now is an embodiment of excluding a vehicle from counting when the vehicle passes over the loop-buried area but does not indeed enter the parking lot, with reference to FIG. 3B. Referring to FIG. 3B, the parking service providing server 300 obtains an image through entrance camera 400 (①), and analyzes the image and identifies whether the trajectory of XY coordinates corresponding to at least one vertex of the license plate of the vehicle or the length or inner area of a figure connecting a plurality of vertexes increases and then decreases or decreases and then increases (②). Where the result is identified as "positive," the parking service providing server 300 may exclude the corresponding vehicle from counting parked vehicles or reduce the parked vehicle count already calculated.

Where the number of vehicles parked, or the number of parking spaces filled or unavailable), which may be referred to as a "parked vehicle count" throughout the disclosure, increases and the number of available parking spaces, or the number of empty parking spaces, which may be referred to as an "available parking space count" throughout the disclosure, decreases, e.g., where the parked vehicle count exceeds 80% of the number of all the parking spaces, the parking service providing server 300 may overlay virtual lines corresponding to the partitioning lines delineated on the parking section and parking spaces to guide an entering vehicle to an available parking section or space.

What is not described regarding the parking service providing method using image grouping-based vehicle identification in connection with FIGS. 2 and 3 is the same or easily inferred from what has been described regarding the parking service providing method using image grouping-based vehicle identification in connection with FIG. 1, and no detailed description thereof is thus presented.

Figure 4:
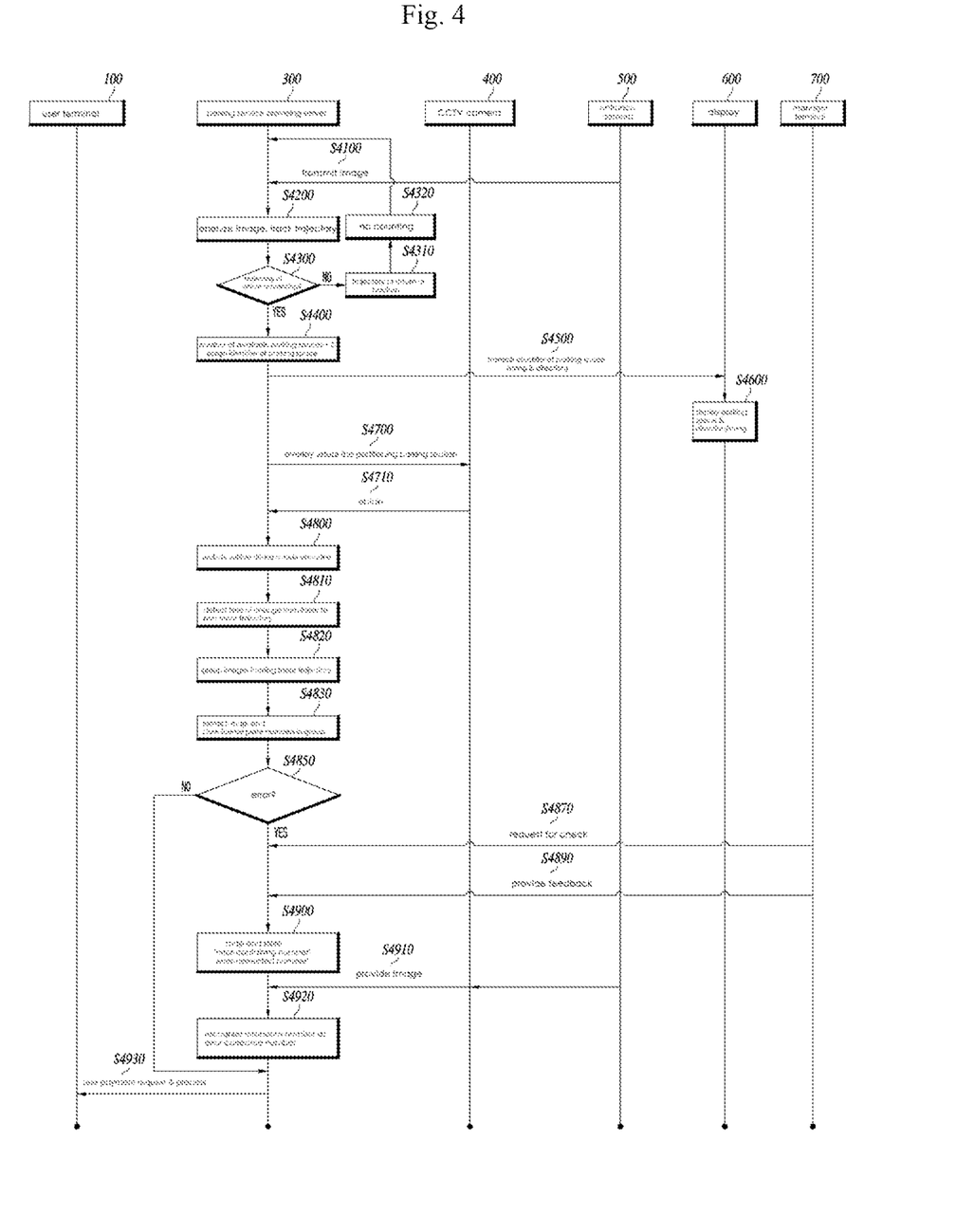
FIG. 4 is a view illustrating an example of transmission and reception of data among components of a parking service providing system using image grouping-based vehicle identification as illustrated in FIG. 1, according to an embodiment of the disclosure.

FIG. 4 is a view illustrating an example of transmission and reception of data among components of a parking service providing system using image grouping-based vehicle identification as illustrated in FIG. 1, according to an embodiment of the disclosure. An example of data transmission and reception among the components is described below with reference to FIG. 4. However, embodiments of the disclosure are not limited thereto, and it is apparent to a skilled artisan that various changes or modifications may be made thereto.

Referring to FIG. 4, upon receiving an image of a vehicle from the entrance camera 500 (S4100), the parking service providing server 300 extracts the trajectory of the license plate through image analysis (S4200). Where the trajectory corresponds to the vehicle advancing, the parking service providing server 300 may regard the vehicle as entering, subtract 1 from the number of available parking spaces, assigns an identifier of an available parking space (S4400), and outputs the direction and text corresponding to the available parking space on the display 600 (S4500 and S4600). Where the result of the analysis reveals that the trajectory corresponds to a U turn or backup (S4310), the parking service providing server 300 returns to S4100 to wait for a next entering vehicle without increasing the number of available parking spaces. Where an error-containing license plate number is detected through the entrance camera 500 and the error is not corrected by artificial intelligence (AI)-based error correction, the parking service providing server 300 may receive an error-corrected license plate number from the manager terminal 700 and map and store the error-containing license plate number and the error-corrected license plate number, thereby preventing a recognition error from occurring due to the vehicle's movement.

The parking service providing server 300 may overlay virtual lines to partition the parking section (S4700), obtain images from the CCTV camera 400, exclude vehicles driving outside the virtual lines from license plate number recognition (S4800) while determining, only for vehicles driving inside the virtual lines, whether the trajectory of their license plate changes from a linear to non-linear trajectory (S4810). The parking service providing server 300 groups the images obtained before the time of change of the trajectory (S4820), extracts license plate numbers from the obtained images, and where the extracted license plate numbers differ from each other, the parking service providing server 300 may map and store the majority license plate number and the other license plate numbers (S4830).

The parking service providing server 300 may perform substantially the same operations as those performed at the entrance of the parking lot. For example, where a recognized license plate number has an error (S4850), the parking service providing server 300 may perform AI-based error correction. Where the error is not corrected even with the AI-based error correction, the parking service providing server 300 may send a request for check on the license plate number to the manager terminal 700 (S4870), receives a feedback from the manager terminal 700 in response to the request (S4890), map and store the error-containing license plate number and the error-corrected license plate number (S4900), and where a license plate number recognized from an image received from the CCTV camera 400 or the entrance camera 500 is the same as the error-containing license plate number, recognizes the license plate number as the error-corrected license plate number (S4910 and S4920). Upon receiving a payment request from the user terminal 100, the parking service providing server 300 performs a payment authorization process and payment process corresponding to the payment request (S4930).

The order of the above-described steps S4100 to S4930 is merely an example, and embodiments of the disclosure are not limited thereto. For example, the above-described steps S4100 to S4930 may be performed in a different order, or some of the steps may be simultaneously performed or omitted.

What is not described regarding the parking service providing method using image grouping-based vehicle identification in connection with FIG. 4 is the same or easily inferred from what has been described regarding the parking service providing method using image grouping-based vehicle identification in connection with FIGS. 1 to 3, and no detailed description thereof is thus presented.

Figure 5:
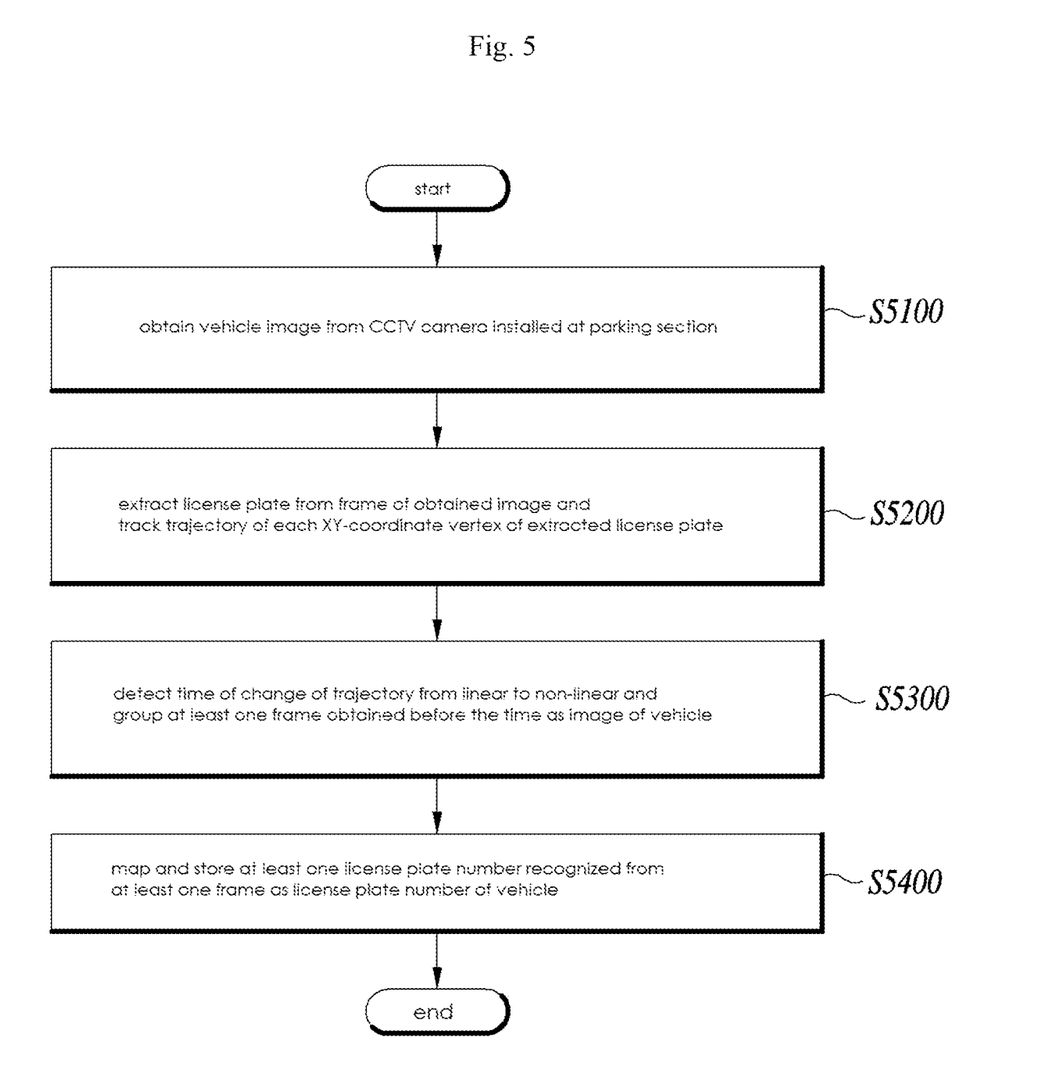
FIG. 5 is a flowchart illustrating a method of providing a parking service using image grouping-based vehicle identification according to an embodiment of the disclosure.

FIG. 5 is a flowchart illustrating a method of providing a parking service using image grouping-based vehicle identification according to an embodiment of the disclosure. Referring to FIG. 5, a parking service providing server obtains a vehicle image from CCTV cameras which are installed on both sides of each parking section and facing vehicles entering to capture the inside of the parking section in the direction perpendicular to the parking orientation of vehicles (S5100).

The parking service providing server may extract the license plate of the vehicle from at least one frame included in the obtained vehicle image, tracks the trajectory of XY coordinates of each vertex of the extracted license plate (S5200), detects the time when the trajectory changes from a linear to non-linear trajectory, and groups at least one frame obtained before the time into an image of the vehicle (S5300).

The parking service providing server maps and stores at least one license plate number recognized from the at least one frame grouped as the license plate number of the vehicle (S5400).

What is not described regarding the parking service providing method using image grouping-based vehicle identification in connection with FIG. 5 is the same or easily inferred from what has been described regarding the parking service providing method using image grouping-based vehicle identification in connection with FIGS. 1 to 4, and no detailed description thereof is thus presented.

According to various embodiments of the disclosure, it may be possible to prevent such an occasion that one vehicle is recognized as being multiple vehicles due to detection of different license plate numbers caused by wrong recognition of the actual, correct license plate number of the vehicle. Further, although one of the wrong license plate numbers is recognized again from an image, the correct license plate number may be grasped. Further, the number of available parking spaces and the number of vehicles currently parked may be precisely calculated, preventing the parking section from being shown "full" despite indeed having at least one available parking space.

The parking service providing method using image grouping-based vehicle identification according to an embodiment described with reference to FIG. 5 may be implemented in the form of a recording medium or computer-readable medium containing computer-executable instructions or commands, such as an application or program module executable on a computer.

The computer-readable medium may be an available medium that is accessible by a computer. The computer-readable storage medium may include a volatile medium, a non-volatile medium, a separable medium, and/or an inseparable medium. The computer-readable medium may include a computer storage medium. The computer storage medium may include a volatile medium, a non-volatile medium, a separable medium, and/or an inseparable medium that is implemented in any method or scheme to store computer-readable commands, data architecture, program modules, or other data or information.

According to an embodiment, the above-described the parking service providing method using image grouping-based vehicle identification may be executed by an application installed on a terminal, including a platform equipped in the terminal or a program included in the operating system of the terminal), or may be executed by an application (or program) installed by the user on a master terminal via an application providing server, such as a web server, associated with the service or method, an application, or an application store server. According to an embodiment, the above-described parking service providing method using image grouping-based vehicle identification may be implemented in an application or program installed as default on the terminal or installed directly by the user and may be recorded in a recording medium or storage medium readable by a terminal or computer.

Although embodiments of the present invention have been described with reference to the accompanying drawings, It will be appreciated by one of ordinary skill in the art that the present disclosure may be implemented in other various specific forms without changing the essence or technical spirit of the present disclosure. Thus, it should be noted that the above-described embodiments are provided as examples and should not be interpreted as limiting. Each of the components may be separated into two or more units or modules to perform its function(s) or operation(s), and two or more of the components may be integrated into a single unit or module to perform their functions or operations.

It should be noted that the scope of the present invention is defined by the appended claims rather than the described description of the embodiments and include all modifications or changes made to the claims or equivalents of the claims.

What is claimed is:

1. A method for providing a parking service by a server configured to provide the parking service, the method comprising:
   obtaining a vehicle image from a closed-circuit television (CCTV) camera installed on each of both sides of each parking section of a parking lot in a direction facing a vehicle entering to capture an inside of the parking section in a direction perpendicular to a parking orientation of the vehicle;
   extracting a license plate of the vehicle from at least one frame included in the obtained vehicle image and tracking a trajectory of an XY-coordinate point of each vertex of the extracted license plate;
   detecting a time when the trajectory of the XY-coordinate point changes from a linear trajectory to a non-linear trajectory and grouping at least one frame obtained before the time into an image for the vehicle; and
   mapping and storing at least one license plate number recognized from the at least one frame grouped as a license plate number of the vehicle.

2. The method of claim 1, wherein the time when the trajectory of the XY-coordinate point changes from the linear trajectory to the non-linear trajectory is a time when the linear trajectory which is continuous changes to the non-linear trajectory which is discontinuous.

3. The method of claim 1, wherein the time when the trajectory of the XY-coordinate point changes from the linear trajectory to the non-linear trajectory is a time when the XY-coordinate point forming the linear trajectory as a figure formed with the XY-coordinate point enlarges or shrinks escapes off the linear trajectory due to XY coordinates of a license plate recognized for another vehicle entering or a time when the XY-coordinate point forming the linear trajectory as a length or inner area of the figure formed with the XY-coordinate point increases or decreases escapes off a preset length or size increase or decrease rate over time due to recognition of the XY coordinates of the other vehicle.

4. The method of claim 1, further comprising:
   before obtaining the vehicle image from the CCTV camera,
   obtaining an entry image from an entrance camera installed at an entrance of the parking lot to face an entering vehicle and configured to capture the entering vehicle;
   extracting a license plate of the entering vehicle from at least one frame included in the entry image and tracking a trajectory of an XY-coordinate point of each vertex of the extracted license plate; and
   where an inner area of a figure formed with the XY-coordinate point changes from increasing or decreasing or where a trajectory of the XY-coordinate point changes from extending to contracting, regarding the entering vehicle as not entering the parking lot and excluding the entering vehicle from parking car counting.

5. The method of claim 1, further comprising:
   before obtaining the vehicle image from the CCTV camera,
   obtaining an entry image from an entrance camera installed at an entrance of the parking lot to face an entering vehicle and configured to capture the entering vehicle;
   extracting a license plate number of the entering vehicle from the entry image;
   where the license plate number contains a preset error, performing artificial intelligence (AI)-based error correction;
   where the preset error is included even after the error correction, sending a request for error correction to a manager terminal to display an error correction request popup window; and
   upon receiving an error-corrected license plate number from the manager terminal in response to the error correction request, mapping and storing the error-containing license plate number and the error-corrected license plate number.

6. The method of claim 5, further comprising, after mapping and storing the error-containing license plate number and the error-corrected license plate number, extracting a license plate number from the vehicle image obtained by the CCTV camera, and where the extracted license plate number is the same as the error-containing license plate number, recognizing the extracted license plate number as the error-corrected license plate number.

7. The method of claim 5, further comprising, after mapping and storing the error-containing license plate number and the error-corrected license plate number, extracting a license plate number from the vehicle image obtained by the CCTV camera, and where the extracted license plate number is different from the error-containing license plate number or the error-corrected license plate number, disregarding the extracted license plate number.

8. The method of claim 1, wherein obtaining the vehicle image from the CCTV camera includes overlaying a virtual line corresponding to a border line of each parking section to identify the parking section and obtaining the vehicle image and excluding an image of a vehicle driving outside the virtual line from license plate recognition.

9. The method of claim 1, further comprising: by the server,
   identifying an available parking space in each parking section using a virtual line to partition each parking section and each parking space; assigning an identifier of an available parking space to a vehicle entering the parking lot; and
   where the entering vehicle is recognized by at least one controller positioned at, at least, one aisle intersection in the parking lot, controlling at least one display positioned at the at least one aisle intersection to output the identifier.

10. The method of claim 1, further comprising:
   after mapping the at least one license plate number recognized from the at least one frame grouped as the license plate number of the vehicle,
   upon receiving a parking fee payment request from a user terminal of a driver of the vehicle, searching for a preset license plate number using a license plate number entered from the user terminal;
   calculating a parking fee by multiplying a per-unit time parking rate by a parking time which is a difference between an entrance time for the preset license plate number searched for and a current time and transmitting the parking fee to the user terminal;
   performing a payment process upon receiving a request for payment for the parking fee using a pre-stored payment means from the user terminal; and
   when the payment process is authorized, allowing a vehicle corresponding to the license plate number entered from the user terminal to be pulled away.

11. The method of claim 1, wherein mapping the at least one license plate number recognized from the at least one frame grouped as the license plate number of the vehicle includes designating a most recognized one of the at least one license plate number as the license plate number of the vehicle and mapping and storing the at least one license plate number based on the designated license plate number.

\* \* \* \* \*